United States Patent Office 3,441,556
Patented Apr. 29, 1969

3,441,556
PROCESS FOR THE PRODUCTION OF AZO
COMPOUNDS
Erwin Scheitlin, Oberwil, Basel-Land, Switzerland, assignor to Sandoz Ltd. (also known as Sandoz AG), Basel, Switzerland
No Drawing. Continuation-in-part of application Ser. No. 424,847, Jan. 11, 1965. This application Aug. 17, 1967, Ser. No. 661,202
Claims priority, application Switzerland, Jan. 13, 1964, 303/64; Jan. 17, 1964, 565/64
Int. Cl. C09b 29/00; C07c 103/20
U.S. Cl. 260—192                    7 Claims

ABSTRACT OF THE DISCLOSURE

A process for the production of azo diestuffs, in which the coupling of the diazonium compounds and the coupling compounds is achieved under non hazardous conditions, in a solvent containing 70 to 100% by volume of a glycol ether or a cyclic ether and 30 to 0% of water.

This is a continuation-in-part of application Ser. No. 424,847 filed Jan. 11, 1965, and now abandoned.

DESCRIPTION

It is known that the coupling of diazo or tetrazo compounds with coupling components can be accelerated by the addition of pyridine or pyridine derivatives, should the energy of coupling in aqueous medium be too low for technical purposes. These bases exercise their accelerating action when present in relatively small amounts. Thus numerous coupling reactions proceed rapidly and result in good yields when the reaction mixture contains 3—25% by volume of pyridine bases. The objectionable odour, however, is a serious inconvenience. It is exceptional for a reaction mixture to contain more than 40% of pyridine bases.

It has been stated that glycol derivatives, e.g. ethylene glycol monomethylether or ethylene glycol monoethylether, as well as cyclic ethers, e.g. dioxan, can be employed as accelerants for coupling reactions in aqueous alkaline medium in place of pyridine. But later it was found that this is not true for all coupling reactions: glycol ethers and cyclic ethers, for instance, in amounts of up to approximately 50% by volume on the reaction mixture, have no or only an insignificant accelerating effect upon the coupling reaction between diazotised amines of the formula

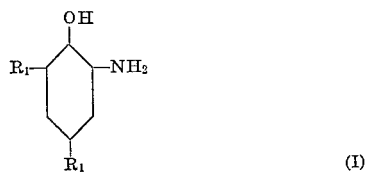

(I)

wherein the two $R_1$ independent of each other represent a hydrogen, chlorine or bromine atom, a nitro, sulfonic acid or sulfonic acid amide group, or one $R_1$, independent of the other, represents a lower alkylcarbonylamino, a lower alkylsulfonylamino, a benzoylamino or a phenylsulfonylamino group, and compounds of formula

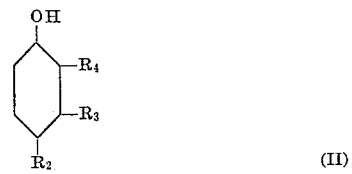

(II)

wherein $R_2$ represents a chlorine or bromine atom or a lower alkyl or alkoxy group, $R_3$ represents a hydrogen atom or together with $R_2$ a tetramethylene radical and $R_4$ represents a hydrogen atom, a lower alkylcarbonylamino, a lower alkylsulfonylamino, a benzoylamino or a phenylsulfonylamino group.

It has now been found that the coupling reactions between diazotised amines of Formula I and compounds of Formula II, which are accelerated to a technically satisfactory degree by the addition of pyridine bases in amounts of up to approximately 25% but are not or only inappreciably accelerated by the addition of dioxan or ethylene glycol monoalkylethers in amounts of up to approximately 50% by volume on the reaction mixture, can be carried out in a technically satisfactory manner and under non hazardous conditions by employing a reaction mixture containing as solvent 70 to 100% by volume of a sulfur-free glycol ether or of a sulfur-free cyclic ether and 30 to 0% by volume of water.

This process is especially suitable for the production of monoazo dyes from a diazotised amine of formula

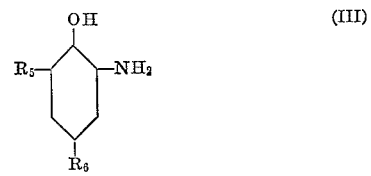

(III)

wherein $R_5$ represents a hydrogen, chlorine or bromine atom, a lower alkylcarbonylamino, a lower alkylsulfonylamino, a benzoylamino, a phenylsulfonylamino, a sulfonic acid or a nitro group and $R_6$ represents a chlorine or bromine atom or a nitro group, and a compound of formula

(IV)

wherein $R_7$ represents a chlorine or bromine atoms or a lower alkyl radical and $R_8$ represents a lower alkyl-carbonylamino, a lower alkylsulfonylamino, a benzoylamino or a phenylsulfonylamino group.

All the "lower" alkyl or alkoxy radicals as well as the "lower" alkyl radicals in the alkylcarbonyl- or alkylsulfonlyamino groups contain 1, 2, 3 or 4 carbon atoms. The sulfonic acid amide groups may be unsubstituted or may be mono- or di-substituted by alkyl radicals having 1 to 4 carbon atoms.

The phenyl nuclei of the benzoylamino and phenylsulfonylamino radicals are preferably unsubstituted, but may be substituted, e.g. by chlorine or bromine atoms, nitro, cyano, lower alkyl or alkoxy groups.

The dyestuffs are obtained in good yields and in comparatively short reaction times. Cyclic ethers are far less hazardous than pyridine bases and their odour is far less unpleasant, while glycol ethers are practically odorless and completely non-hazardous. The reaction mixture may contain a higher concentration both of the diazo component and of the coupling component than is practicable in an aqueous medium containing pyridine bases, a factor which makes the new process advantageous from the standpoint of operating costs. If the product of the coupling reaction is one which contains metallizable groups, the metallizing reaction can be effected subsequently to the coupling reaction in the same medium. When a water-pyridine mixture is used as coupling medium, the cost of performing the metallizing step is far less economic.

The preferred glycol ethers are the monoalkyl and dialkyl ethers of ethylene glycol or of the lower polyethylene glycols, e.g. of di-, tri- or tetra-ethylene glycol, the alkyl radicals of which contain 1 to 4 carbon atoms. The analogous polyglycols themselves, as well as other high-molecular ethers of this nature, e.g. those of molecular weights up to about 1500, and the corresponding derivatives of propylene glycol or butylene glycol can be used with good success. Tetrahydrofuran and dioxan are two examples of suitable cyclic ethers. Mixtures of the aforenamed compounds may be employed if desired. The glycol ethers or cyclic ethers are used, with or without water as preferred, in amounts giving a readily stirrable reaction mixture. In most instances the ratio by weight is approximately 1 part of coupling component to approximately 2 to 5 parts of the chosen solvent or solvent mixture.

The assistants commonly used in coupling reactions may be employed, for example the stabilizers referred to by H. Zollinger in "Chemie der Azofarbstoffe" (Birkhäuser Verlag, Basel, 1958). In general, the coupling reaction can be effected at ambient temperature, very often in fact within the range 0° C. to +10° C. The pH value chosen is one within the range normal for the particular coupling reaction to be performed. Thus the coupling components of Formula I are generally coupled between pH 9 and 11, e.g. in the presence of sodium hydroxide, sodium carbonate, magnesium carbonate, magnesium oxide or calcium oxide.

In the following examples the parts and percentages are by weight and the temperatures in degrees centigrade.

Example 1

126 parts of 2-amino-1-hydroxy-4-nitrobenzene-6-sulfonic acid are mixed with 540 parts of ethylene glycol monoethylether. 86 parts of 30% hydrochloric acid are added and the temperature, which thereby rises to 30°, is brought down to 20°. In the course of 30–45 minutes a solution of 37 parts of sodium nitrite in 70 parts of water is run in at a controlled temperature of 20°. On completion of diazotization about 50 parts of sodium bicarbonate are added so that the mixture reacts neutral to Congo paper.

The suspension of the diazo compound is allowed to flow into a mixture of 135 parts of 2-benzoylamino-1-hydroxy-4-methylbenzene and 540 parts of ethylene glycol monoethylether at a controlled temperature of 0°. Over the next 5–6 hours 60 parts of a 30% aqueous solution of sodium hydroxide are added at an even rate, the temperature being maintained further at 0°. The resulting coupling mass is poured into 4000 parts of water, upon which the greater part of the azo dye formed is precipitated in finely crystalline form. Precipitation is completed by adding 825 parts of sodium chloride. This causes the pH to rise to 9.5 and it is adjusted to 5.5 with about 26 parts of 30% hydrochloric acid. The dye is filtered off with suction and vacuum dried at 100°.

In the following examples the solvents named in Table 1 are employed with good success in place of ethylene glycol monoethylether.

TABLE 1

| Example No.: | Solvent |
|---|---|
| 2 | Ethylene glycol monomethylether. |
| 3 | Ethylene glycol monobutylether. |
| 4 | Ethylene glycol dimethylether. |
| 5 | 1,3-propylene glycol monomethylether. |
| 6 | 1,5-pentandiol monomethylether. |
| 7 | Diethylene glycol monoethylether. |
| 8 | Diethylene glycol dimethylether. |
| 9 | Dioxan. |

Example 10

76.6 parts of sodium 2-amino-4-nitro-1-phenolate are stirred into 200 parts of water at 0°. A solution of 5 parts of disodium dinaphthylmethane disulphonate in 20 parts of water is added, then the mixture is stirred for 30 minutes and run into 143 parts of a 25% sodium nitrite solution. 300 parts of ice are added, the mixture vigorously stirred and acidified with 127 parts of 30% hydrochloric acid, upon which there is a temperature increase to around 15°. On completion of diazotization the excess nitrite is destroyed with amido-sulfonic acid and 2–5 parts of sodium bicarbonate are added to the suspension to give a neutral reaction to Congo paper.

The 2-diazo-1-hydroxy-4-nitrobenzene is isolated by filtration and united with 300 parts of ethylene glycol monoethylether. 72.4 parts of 2-acetylamino-1-hydroxy-4-methylbenzene are added to the mixture, which is then stirred with external cooling until the temperature falls to 0°. In the course of 8–9 hours 80 parts of 30% sodium hydroxide solution are allowed to flow into the reaction mixture with constant vigorous stirring. During this time the temperature is maintained at maximum 3° by external cooling.

The reaction mixture is run into 1400 parts of a 5% sodium chloride solution, upon which the greater part of the azo dye formed is precipitated in finely crystalline form. 69 parts of 30% hydrochloric acid are dropped in to complete precipitation, so that a pH value of 6 is obtained. The dye is isolated by filtration and dried at 60° in vacuum. The ethylene glycol monoethylether used in Example 10 can be successfully replaced by the solvents named in Table 2.

TABLE 2

| Example No.: | Solvent |
|---|---|
| 11 | Ethylene glycol monomethylether. |
| 12 | Ethylene glycol monopropylether. |
| 13 | Ethylene glycol monobutylether. |
| 14 | Ethylene glycol dimethylether. |
| 15 | Ethylene glycol diethylether. |
| 16 | Ethylene glycol dibutylether. |
| 17 | 1,3-propylene glycol monomethylether. |
| 18 | 1,3-propylene glycol diethylether |
| 19 | 1,4-butylene glycol monomethylether. |
| 20 | 1,5-pentandiol monomethylether. |
| 21 | Diethylene glycol dimethylether. |
| 22 | Diethylene glycol diethylether. |
| 23 | Triethylene glycol. |
| 24 | Diethylene glycol monoethylether. |
| 25 | Triethylene glycol monomethylether. |
| 26 | Dipropylene glycol. |
| 27 | Dioxan. |
| 28 | Tetrahydrofuran. |

Example 29

86.5 parts of 30% hydrochloric acid and 300 parts of ice are mixed together and to this mixture, whose temperature is roughly 18°, are added in portions with stirring 105.5 parts of 6-acetylamino-2-amino-1-hydroxy-4-nitrobenzene. As soon as a homogeneous suspension is formed, a solution of 34.5 parts of sodium nitrite in 70 parts of water is gradually added in the course of 1 hour. During this time the temperature is maintained at 0° by adding ice. When diazotization is completed the small excess of nitrite is destroyed by adding aminosulfonic acid, and the diazo component isolated by filtration. Approximately 310 parts of the diazo compound are obtained.

The moist 6-acetylamino-2-diazo-1-hydroxy-4-nitrobenzene and 108.8 parts of 2-acetylamino-1-hydroxy-4-tertiarybutylbenzene are added successively to 300 parts of ethylene glycol monoethylether containing 5 parts of magnesium carbonate. The mixture is stirred for 30 minutes and at the same time cooled to 0°. Then a finely divided suspension of 55 parts of calcium hydroxide and 100 parts of ethylene glycol monoethylether is run into the mixture in 1 hour with vigorous stirring, care being taken that the temperature does not rise to above 0°.

When the few hours necessary for completion of the coupling reaction have elapsed, the reaction mixture is slowly diluted with about 1600 parts of water. 300 parts of sodium chloride are added, the mixture stirred for 30 minutes, another 150 parts of sodium chloride added, stirring continued for 30 minutes, and then the azo dye may be reacted as described in Example 10; the ethylene glycol monoethylether used in this example can be successfully replaced by the solvents named in Table 2.

TABLE 3

| Example No. | $R_1$ | $R_1'$ | $R_2$ | $R_4$ |
|---|---|---|---|---|
| 31 | $-NO_2$ | $-NO_2$ | $-CH_3$ | $-NHCOCH_3$ |
| 32 | $-SO_2NH_2$ | $-H$ | $-CH_3$ | $-NHCOCH_3$ |
| 33 | $-Cl$ | $-NO_2$ | $-CH_3$ | $-NHCOCH_3$ |
| 34 | $-NO_2$ | $-Cl$ | $-CH_3$ | $-NHCOCH_3$ |
| 35 | $-NO_2$ | $-H$ | $-Cl$ | $-NHCOCH_3$ |
| 36 | $-NO_2$ | $-H$ | $-OCH_3$ | $-H$ |
| 37 | $-Br$ | $-NO_2$ | $-C_2H_5$ | $-NHCOC_2H_5$ |
| 38 | $-SO_2NHC_2H_5$ | $-H$ | $-CH_3$ | $-NHCOCH_3$ |
| 39 | $-NO_2$ | $-Br$ | $-C_3H_7$ | $-NHCOCH_3$ |
| 40 | $-NO_2$ | $-H$ | $-Br$ | $-NHCOCH_3$ |
| 41 | $-NO_2$ | $-H$ | $-OC_2H_5$ | $-NHCOCH_3$ |
| 42 | $-NO_2$ | $-NO_2$ | $-CH_3$ | $-NHSO_2CH_3$ |
| 43 | $-NO_2$ | $-Br$ | $-C_2H_5$ | $-NHSO_2C_6H_5$ |
| 44 | $-Cl$ | $-NO_2$ | $-OC_3H_7$ | $-NHCOCH_3$ |
| 45 | $-H$ | $-SO_2NH_2$ | $-C(CH_3)_3$ | $-NHCOCH_3$ |
| 46 | $-NHCOC_2H_5$ | $-NO_2$ | $-CH_3$ | $-NHCOC_2H_5$ |
| 47 | $-NHSO_2CH_3$ | $-NO_2$ | $-CH_3$ | $-NHCOCH_3$ |
| 48 | $-NHCOC_6H_5$ | $-NO_2$ | $-CH_3$ | $-NHCOCH_3$ |
| 49 | $-NO_2$ | $-NHCOC_2H_5$ | $-CH_3$ | $-NHCOC_2H_5$ |
| 50 | $-NO_2$ | $-NHCOC_4H_9$ | $-CH_3$ | $-NHCOCH_3$ |
| 51 | $-NO_2$ | $-SO_3H$ | $-CH_3$ | $-NHCOC_3H_7$ |
| 52 | $-H$ | $-SO_2N(CH_3)_2$ | $-CH_3$ | $-NHCOC_6H_5$ |
| 53 | $-SO_2N(CH_3)_2$ | $-H$ | $-CH_3$ | $-NHCOC_2H_5$ |
| 54 | $-SO_3H$ | $-NO_2$ | $-CH_3$ | $-NHCOCH_3$ |
| 55 | $-NHSO_2C_6H_5$ | $-NO_2$ | $-CH_3$ | $-NHCOCH_3$ |
| 56 | $-NO_2$ | $-NHCOC_6H_5$ | $-CH_3$ | $-NHCOCH_3$ | formed is filtered off. It is suspended in 2000 parts of a 10% sodium chloride solution, filtered and dried in vacuum at 100°.

Method of metallization.—The dye produced according to the particulars given in Example 10 can be metallized by dissolving it in water, heating the solution to 60° and adding a solution of cobalt sodium tartrate prepared with 145 parts of water, 61 parts of cobalt sulfate, 16.3 parts of tartaric acid and 85 parts of 30% sodium hydroxide solution. The metallizing reaction is completed in a short time, and the dye is precipitated by the addition of 270 parts of sodium chloride at pH 11–11.5, filtered off and dried.

Example 30

76.6 parts of sodium 2-amino-4-nitrophenolate are stirred into 200 parts of water at 0°. A solution of 5 parts of disodium dinaphthylmethane disulphonate in 20 parts of water is added, the mixture is stirred for 30 minutes, then 143 parts of 25% sodium nitrite solution are added, followed by about 300 parts of ice, while thorough stirring is maintained. The mixture is acidified with 127 parts of 30% hydrochloric acid, upon which the temperature rises temporarily to about 15°. When diazotization is finished the excess nitrite is destroyed with amidosulphonic acid and 2–5 parts of sodium carbonate are added until the suspension reacts acid to Congo paper. The 2-diazo-1-hydroxy-4-nitrobenzene formed is isolated by filtration. 74 parts of 2-hydroxy-5,6,7,8-tetrahydronaphthalene are dissolved in 400 parts of ethylene glycol monoethyl ether. The moist diazo compound is added to this solution with stirring and external cooling until the temperature falls to 0°. In the course of 8–9 hours 80 parts of 30% sodium hydroxide solution are run in with thorough stirring, the temperature being maintained at maximum 3° during this time. The reaction mixture is then run into 1400 parts of 5% sodium chloride solution, upon which the greater part of the azo dye formed is precipitated in a fine crystalline form. To complete precipitation 69 parts of 30% hydrochloric acid are added so that the pH value 6 is obtained. The dye is separated by filtration and vacuum dried at 80°.

The substances enumerated in the following table conforming to formulae

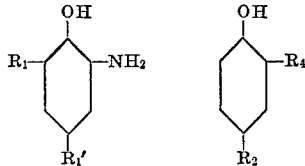

Having thus disclosed the invention what I claim is:

1. In a process for producing azo compounds by coupling in a solvent a diazotized amine of the formula

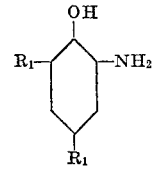

wherein:
  each $R_1$ is, independently a member selected from the group consisting of a hydrogen atom, chloro, bromo, nitro, $-SO_3H$ and a sulfonic acid amide; or
  one $R_1$ is, independent of the other, a member selected from the group consisting of lower alkylcarbonylamino, lower alkylsulfonylamino, benzoylamino and phenylsulfonylamino;

with a compound of the formula

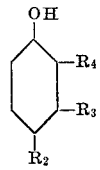

wherein:
  $R_2$ is a member selected from the group consisting of chloro, bromo, lower alkyl, lower alkoxy and, together with $R_3$, tetramethylene;
  $R_3$ is a member selected from the group consisting of a hydrogen atom and, together with $R_2$, tetramethylene; and
  $R_4$ is a member selected from the group consisting of a hydrogen atom, lower alkylcarbonylamino, lower alkylsulfonylamino, benzoylamino and phenylsulfonylamino;

the improvement wherein the solvent comprises from 70 to 100% by volume of a member selected from the group consisting of a sulfur-free glycol ether and a sulfur-free cyclic ether and from 30 to 0% by volume of water.

2. A process according to claim 1 wherein the solvent contains 70 to 100% by volume of a sulfur-free cyclic ether.

3. A process according to claim 1 wherein the solvent contains 70 to 100% by volume of a sulfur-free glycol ether.

4. A process according to claim 3 wherein the sulfur-free glycol ether is ethylene glycol monoethylether.

5. A process according to claim 1 wherein the amine, which is diazotized, is of the formula

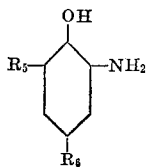

wherein:

$R_5$ is a member selected from the group consisting of a hydrogen atom, chloro, bromo, lower alkylcarbonylamino, lower alkylsulfonylamino, benzoylamino, phenylsulfonylamino, —$SO_3H$ and nitro; and $R_6$ is a member selected from the group consisting of chloro, bromo and nitro;

and the compound with which said amine is coupled is of the formula

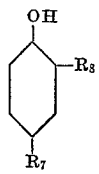

wherein:

$R_7$ is a member selected from the group consisting of chloro, bromo and lower alkyl; and $R_8$ is a member selected from the group consisting of lower alkyl-carbonylamino, lower alkylsulfonylamino, benzoylamino and phenylsulfonylamino.

6. A process according to claim 1 wherein the solvent comprises from 70 to 100% by volume of a member selected from the group consisting of ethylene glycol monoethylether, ethylene glycol monopropylether, ethylene glycol monobutylether, ethylene glycol dimethylether, ethylene glycol diethylether, ethylene glycol dibutylether, 1,3-propylene glycol monomethylether, 1,3-propylene glycol diethylether, 1,4-butylene glycol monomethylether, 1,5-pentandiol monomethylether, diethylene glycol dimethylether, diethylene glycol diethylether, triethylene glycol, diethylene glycol monoethylether, triethylene glycol monomethylether, dipropylene glycol, dioxan and tetrahydrofuran.

7. A process according to claim 3 wherein the sulfur-free glycol ether is a member selected from the group consisting of (a) monoalkyl and dialkyl ethers of ethylene glycol, propylene glycol and butylene glycol, each alkyl having from 1 to 4 carbon atoms, (b) lower polyethylene, polypropylene and polybutylene glycols, (c) lower polyalkylene polyglycols and (d) high-molecular weight poly(lower) alkylene ethers having molecular weights up to about 1500.

References Cited
UNITED STATES PATENTS

| | | | |
|---|---|---|---|
| 2,807,609 | 9/1957 | Danuser et al. | 260—176 |
| 2,809,964 | 10/1957 | Baggenstoss et al. | 260—205 |
| 2,824,096 | 2/1958 | Heckert | 260—192 |
| 3,218,311 | 11/1965 | Forter et al. | 260—161 |
| 3,278,516 | 10/1966 | Scherer et al. | 260—163 |

FLOYD D. HIGEL, *Primary Examiner.*

U.S. Cl. X.R.

260—207, 206, 144, 149, 575, 556, 562, 559